United States Patent
Zou et al.

(10) Patent No.: US 10,248,848 B2
(45) Date of Patent: Apr. 2, 2019

(54) METHOD AND APPARATUS FOR IMPROVED FACIAL RECOGNITION

(75) Inventors: Yanming Zou, Beijing (CN); Yong Ma, Beijing (CN); Kongqiao Wang, Beijing (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/381,728

(22) PCT Filed: Mar. 13, 2012

(86) PCT No.: PCT/CN2012/072286
§ 371 (c)(1),
(2), (4) Date: Aug. 28, 2014

(87) PCT Pub. No.: WO2013/134932
PCT Pub. Date: Sep. 19, 2013

(65) Prior Publication Data
US 2015/0055834 A1    Feb. 26, 2015

(51) Int. Cl.
*G06K 9/00* (2006.01)
*G06K 9/46* (2006.01)

(52) U.S. Cl.
CPC ..... *G06K 9/00295* (2013.01); *G06K 9/00281* (2013.01); *G06K 9/00288* (2013.01); *G06K 9/00302* (2013.01); *G06K 9/4642* (2013.01)

(58) Field of Classification Search
None
See application file for complete search history.

(56) References Cited

U.S. PATENT DOCUMENTS

| | | | |
|---|---|---|---|
| 7,203,346 B2 * | 4/2007 | Kim | G06K 9/00275 351/209 |
| 7,321,670 B2 * | 1/2008 | Yoon | G06K 9/00268 382/118 |
| 7,817,826 B2 | 10/2010 | Chen | |
| 2003/0086593 A1 | 5/2003 | Liu et al. | |
| 2006/0176301 A1 | 8/2006 | Sohn et al. | |
| 2009/0310828 A1 | 12/2009 | Kakadiaris et al. | |

(Continued)

FOREIGN PATENT DOCUMENTS

| CN | 102147862 A | 8/2011 |
|---|---|---|
| CN | 102194106 A | 9/2011 |

(Continued)

OTHER PUBLICATIONS

International Search Report and Written Opinion received for corresponding Patent Cooperation Treaty Application No. PCT/CN2012/072286, dated Dec. 6, 2012, 10 pages.

(Continued)

*Primary Examiner* — Fred H Hu
(74) *Attorney, Agent, or Firm* — Alston & Bird LLP

(57) ABSTRACT

A method, apparatus and computer program product for an improved facial recognition system are provided. Some embodiments may utilize a weighted block division of an image and capture a property measurement for pixels residing within a block. The measurements may be converted to vectors, compressed, and compared against compressed vectors of enrolled images to identify a characteristic or an image of a matching subject. Training processes may be utilized in order to optimize block divisions and weights.

15 Claims, 8 Drawing Sheets

(56) References Cited

U.S. PATENT DOCUMENTS

| | | | |
|---|---|---|---|
| 2010/0135541 A1 | | 6/2010 | Lai et al. |
| 2011/0293189 A1* | | 12/2011 | Sun .................. G06K 9/00268 |
| | | | 382/195 |
| 2012/0321140 A1 | | 12/2012 | Xiong et al. |
| 2013/0127853 A1* | | 5/2013 | Corazza ................ G06T 13/40 |
| | | | 345/420 |
| 2014/0147023 A1* | | 5/2014 | Lee ................... G06K 9/00288 |
| | | | 382/118 |

FOREIGN PATENT DOCUMENTS

| | | | |
|---|---|---|---|
| CN | 102324022 A | | 1/2012 |
| CN | 102640168 | | 8/2012 |
| EP | 1 411 459 A1 | | 4/2004 |
| GB | 2452513 A | | 3/2009 |
| KR | 10-1130817 | * | 3/2012 |
| WO | WO-2010/133938 A1 | | 11/2010 |
| WO | WO-2011/149976 A2 | | 12/2011 |

OTHER PUBLICATIONS

Extended European Search Report from corresponding European Patent Application No. 12871162.9 dated Feb. 2, 2017.

Huang, Xiaohua et al.; "Dynamic Facial Expression Recognition Using Boosted Component-Based Spatiotemporal Features and Multi-classifier Fusion" Dec. 13, 2010; Advanced Concepts for Intelligent Vision Systems; Springer Berlin, Heidelberg; pp. 312-322; XP019159176.

Schwartz, W R et al.; "Face Identification Using Large Feature Sets"; IEEE Transaction on Image Processing; IEEE Service Center; Piscataway, NJ; vol. 21, No. 4; Nov. 22, 2011; pp. 2245-2255; XP011491991.

Office Action for corresponding Chinese Application No. 201280071403.4 dated Jul. 6, 2017, 8 pages.

Office Action for corresponding Chinese Application No. 201280071403.4 dated Oct. 31, 2016.

Supplemental European Search Report for European Application No. 12871162.9 dated Oct. 6, 2016, 7 pages.

Office Action for European Application No. 12 871 162.9 dated Dec. 21, 2017, 5 pages.

3D Face Reconstruction with a Four Camera Acquisition System [online] [retrieved from the Internet Mar. 3, 2016]. Retrieved from the Internet: <URL: http://gps-tsc.upc.es/GTAV/Rama/Publications/Onofrio-Rama-VLBV05.pdf>. 4 pages.

An Effective Approach to Pose Invariant 3D Face Recognition [online] [retrieved from the Internet Mar. 3, 2016]. Retrieved from the Internet: <URL: http://www.ntu.edu.sg/home/yhe/papers/mmm11_pifr.pdf>. 11 pages.

Blanz, Volker and Vetter, Thomas; "A Morphable Model for the Synthesis of 3D Faces"; Proc. Siggraph 99, ACM Press, 1999; pp. 187-194.

Blanz, Volker and Vetter, Thomas; "Face Recognition Based on Fitting a 3D Morphable Model"; IEEE Transactions on Patern Analysis and Machine Intelligence; vol. 25, No. 9; pp. 1063-1074; Sep. 2003.

Canavan, Shaun J., et al.; "Face Recognition by Multi-Frame Fusion of Rotating Heads in Videos"; IEEE; 2007; 6 pages.

Kim, Yongsuk Jang et al.; "3D Face Modeling Based on 3D Dense Morphable Face Shape Model"; World Academy of Science, Engineering and Technology 37, 2008; pp. 103-108.

Line-based PCA and LDA approaches for Face Recognition [online] [retrieved Dec. 29, 2015]. Retrieved from the Internet: <URL:http://uclab.khu.ac.kr/resources/publication/J_27.pdf>. 8 pages.

Morphable Face Reconstruction with Multiple Images [online] [retrieved from the Internet Mar. 3, 2016]. Retrieved from the Internet: <URL: http://www.google.com/url?sa=t&source=web&cd=6&ved=0CEkQFjAF&url=http%3A%2F%2Fciteseerx.ist.psu.edu%2Fviewdoc%2Fdownload%3Fdoi%3D10.1.1.74.8046%26rep%3Drep1%26type%3Dpdf&rct=j&q=3D%20Face%20Reconstruction%20face%20recognition%20weights&ei=MmuWTvKGCYLjrAe37JmIBA&usg=AFQjCNG0SnI31dUpa5zPp_6TrHsc7zpy0Q&cad=rja>. 6 pages.

Park, Unsang et al.;"3D Face Reconstruction from Stereo Video"; Proceedings of the 3rd Canadian Conference on Computer and Robot Vision (CRV 2006); IEEE; 8 pages Park, Unsang et al.; "3D Model-Assisted Face Recognition in Video"; Proceedings of the Second Canadian Conference on Computer and Robot Vision (CRV 2005); 8 pages Park, Unsang et al.; "3D Model-Based Face Recognition in Video"; The 2nd International Conference on Biometrics, Seoul, Korea, 2007; 10 pages.

Pollefeys; "3D Modelling from Images"; Obtained from Internet Dec. 31, 2015.

Wang, Yueming et al.; "3D Face Recognition by Local Shape Difference Boosting"; ECCV 2008, Part 1, LNCS 5302, pp. 603-616, 2008.

* cited by examiner

| | Grayscale | Frequency |
|---|---|---|
| Block 1 | 0 | 16 |
| | 1 | 19 |
| | 2 | 10 |
| | 3 | 18 |
| | 4 | 13 |
| | ⋮ | ⋮ |
| | 250 | 69 |
| | 251 | 62 |
| | 252 | 67 |
| | 253 | 59 |
| | 254 | 50 |
| | 255 | 69 |
| Block 2 | 0 | 42 |
| | 1 | 15 |
| | 2 | 24 |
| | 3 | 38 |
| | 4 | 38 |
| | ⋮ | ⋮ |
| | 250 | 21 |
| | 251 | 43 |
| | 252 | 31 |
| | 253 | 23 |
| | 254 | 36 |
| | 255 | 24 |
| ⋮ | ⋮ | ⋮ |
| Block 500 | 0 | 13 |
| | 1 | 16 |
| | 2 | 12 |
| | 3 | 33 |
| | 4 | 33 |
| | ⋮ | ⋮ |
| | 250 | 30 |
| | 251 | 21 |
| | 252 | 30 |
| | 253 | 12 |
| | 254 | 16 |
| | 255 | 22 |

Figure 5a

| Original Feature Vector | |
|---|---|
| 0 | 16 |
| 1 | 19 |
| 2 | 10 |
| 3 | 18 |
| ⋮ | ⋮ |
| 127997 | 31 |
| 127998 | 34 |
| 127999 | 20 |

Figure 5b

| Compressed Feature Vector | |
|---|---|
| 0 | 16 |
| 1 | 19 |
| 2 | 10 |
| 3 | 18 |
| ⋮ | ⋮ |
| 498 | 20 |
| 499 | 10 |
| 500 | 17 |

Figure 5c

METHOD AND APPARATUS FOR IMPROVED FACIAL RECOGNITION

RELATED APPLICATION

This application was originally filed as Patent Cooperation Treaty Application No. PCT/CN2012/072286 filed Mar. 13, 2012.

TECHNOLOGICAL FIELD

An example embodiment of the present invention relates generally to facial recognition, and more particularly, to a method, apparatus and computer program product improving the efficiency and accuracy of identifying facial characteristics and identifying a subject facial image as resembling a facial image in an enrolled group.

BACKGROUND

Facial recognition systems have proved useful in a variety of fields. Facial recognition has played a role in biometric security. For example, an automatic teller machine user's identification could be confirmed by capturing a real-time image of an individual as they withdraw cash from an account and comparing it to an image on record. Law enforcement has on occasion used facial recognition systems to identify wanted persons by capturing facial images in public crowds and comparing them against images in a database of wanted persons.

Although useful, current methods of facial recognition leave room for improvement. Variants across facial images, such as head tilt, illumination, and expression can negatively impact the precision of feature recognition, ultimately leading to failure in finding a match where the subject image is that of an individual that is indeed enrolled in a sample group or database.

Additionally, many methods aimed at improving facial identification success rates are implemented at the expense of efficiency. For example, precision could be improved immensely by analyzing every pixel of every image or applying complex normalizing algorithms to images. However, tasks such as these may be computationally expensive and slow the facial recognition process.

BRIEF SUMMARY

A method, apparatus, and computer program product are therefore provided for improving the efficiency and accuracy of facial recognition systems. Implementing facial recognition systems with improved efficiency leads to conservation of computation resources, which in turn can allow the systems to process a higher volume of images in a short amount of time. Systems that aim toward improving efficiency will better satisfy the demands of facial recognition systems implemented in public settings or those that require the processing of a high volume of images in a limited timeframe. Improving the accuracy of the system will lead to a greater number of successful identifications, and a lower error rate.

In one embodiment, a method is provided for identifying an enrolled image that resembles a subject facial image. A statistical property is identified by which to measure pixels in a block of the subject image. The measurements are converted into a feature vector, and utilized to identify facial characteristics, such as age, gender, or emotions. A feature vector may also be compared to enrolled feature vectors to identify a matching subject. Additionally, the method of one embodiment may compress the feature vectors of the subject and enrolled images by applying a dimension compression matrix. The method of some embodiments may determine the feature vectors by converting the measurements into histograms illustrating frequencies of unique property measurements, and, in some embodiments, may further convert a plurality of histograms in order to arrive at the feature vector for the image.

In another embodiment, a block division method is evaluated by first applying the block division method to a training group of images, comprising subsets of images of the same individuals. The images are then classified in accordance with this embodiment utilizing the feature vectors obtained with a common statistical measurement, and the results of the classification are used to determine a dimension compression matrix. The same block division method, statistical measurement, and compression matrix may be used to convert a group of evaluation images into feature vectors. The evaluation images may then be classified based on the vectors, and the success rate of the classification indicates the effectiveness of the block division method.

The method of some embodiments may employ a block division method in which blocks overlap one another. The method of other embodiments may employ techniques resulting in a division in which blocks are self-contained.

An additional embodiment provides a method for weighting the blocks and incorporating the weights into the feature vector in a way such that not every block has the same significance in the identification process. More specifically, another embodiment provides a method for determining the weight of a block through classification iterations of a training group, in which the iterations call for varying the weights of the blocks. Ideal weights may be identified by analyzing a block's impact on a classification error rate throughout the iterations.

Methods according to some embodiments include identifying a plurality of key points of the facial image, measuring distances from a pixel to a plurality of key points, and encompassing the pixel and a closest key point in a block. A method may also be provided to assign a weight to a facial feature point of the facial image and utilize the weight in normalizing the facial image prior to a vector conversion and identification process.

In another embodiment, an apparatus is provided that includes at least one processor and at least one memory including computer program code with the at least one memory and the computer program code configured to, with the processor, cause the apparatus to receive a subject facial image, determine statistical property measurements by pixel in a block of the image, convert the measurements into a vector, identify characteristics, and compare subject and sample vectors in order to classify the images. The at least one memory and computer program code may also be configured to, with the processor, cause the apparatus to compress the feature vectors, such as with a dimension compression matrix, or create histograms illustrating the frequency of statistical property measurements while converting an image to a feature vector. The at least one memory and computer program code may also be configured to, with the processor, cause the apparatus to utilize a training processes to evaluate various block division methods or block weights applied to a facial image.

Similarly, in a further embodiment, a computer program product is provided that includes at least one non-transitory computer-readable storage medium having computer-executable program code instructions to identify characteristics and facial images by utilizing feature vectors. Additional embodiments include a computer program product that compresses the vectors. Other embodiments contain executable program code instructions that produce histograms while determining feature vectors, or provide training mechanisms for identifying block division methods and weights to apply to the blocks.

Additionally, the apparatus of some embodiments provide means for identifying facial images by utilizing feature vectors. Apparatuses of additional embodiments include means for compressing the vectors, while others include means for producing histograms while determining feature vectors, or providing training mechanisms for identifying block division methods and weights to apply to the blocks.

BRIEF DESCRIPTION OF THE DRAWINGS

Figure 1:
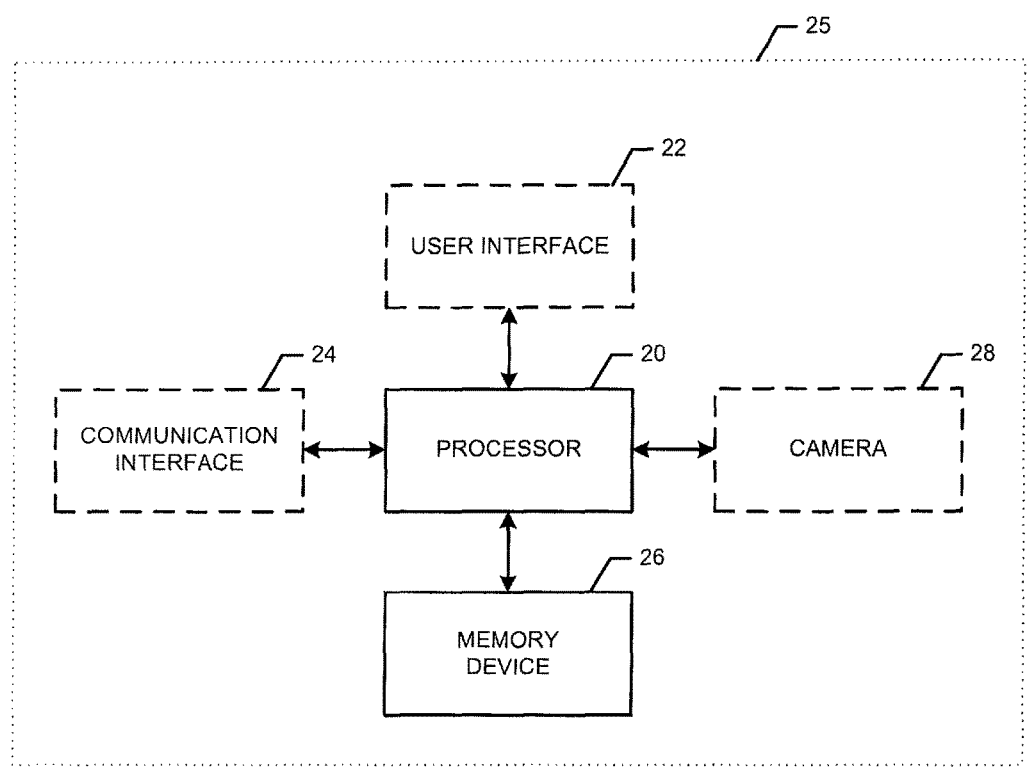
Figure 2:
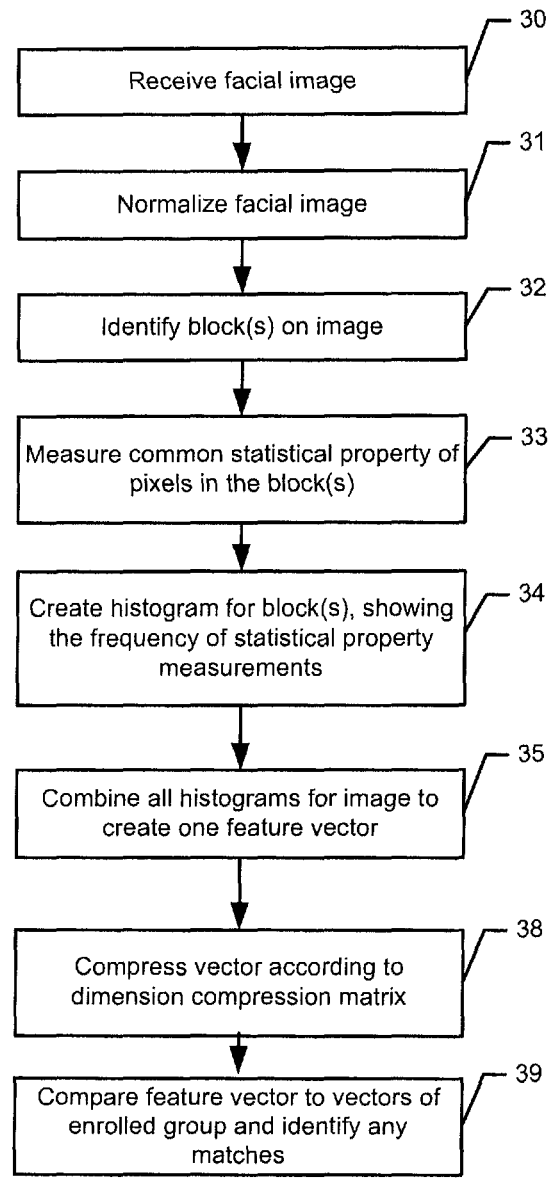
Figure 3A:
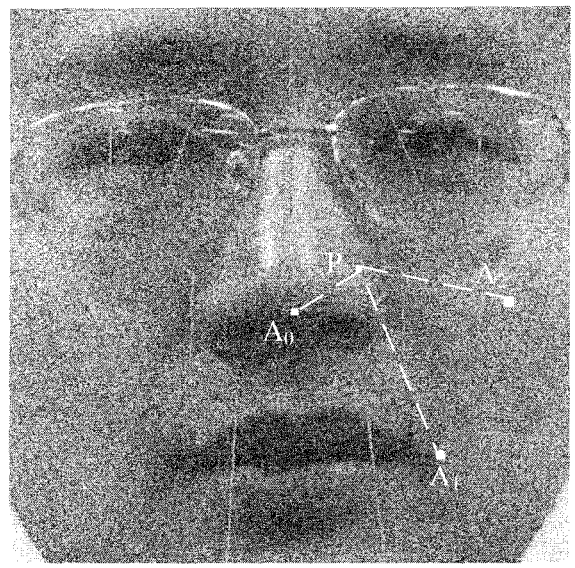
Figure 3B:
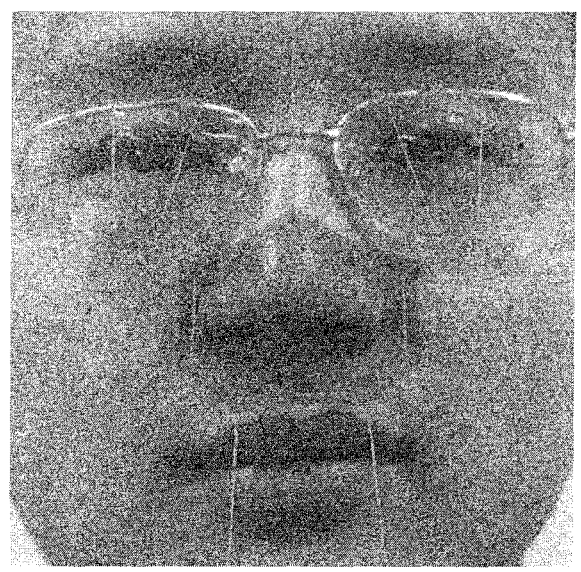
Figure 4:
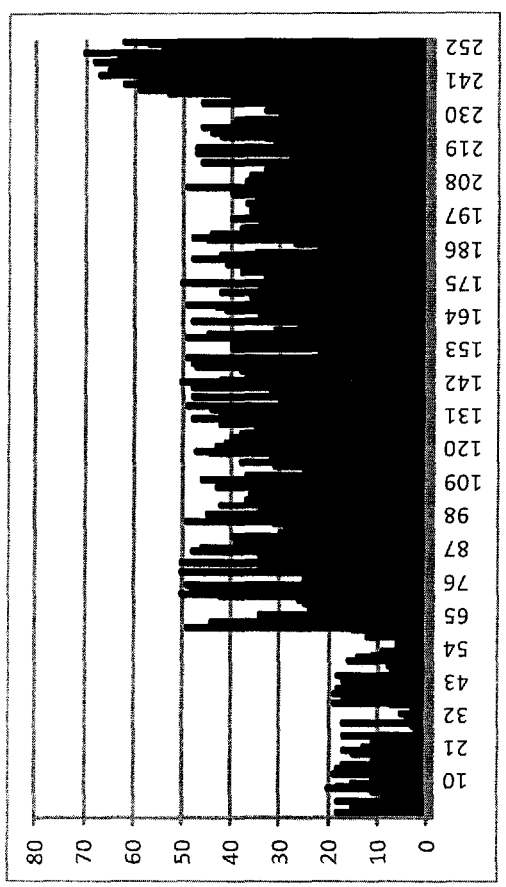
Figure 6:
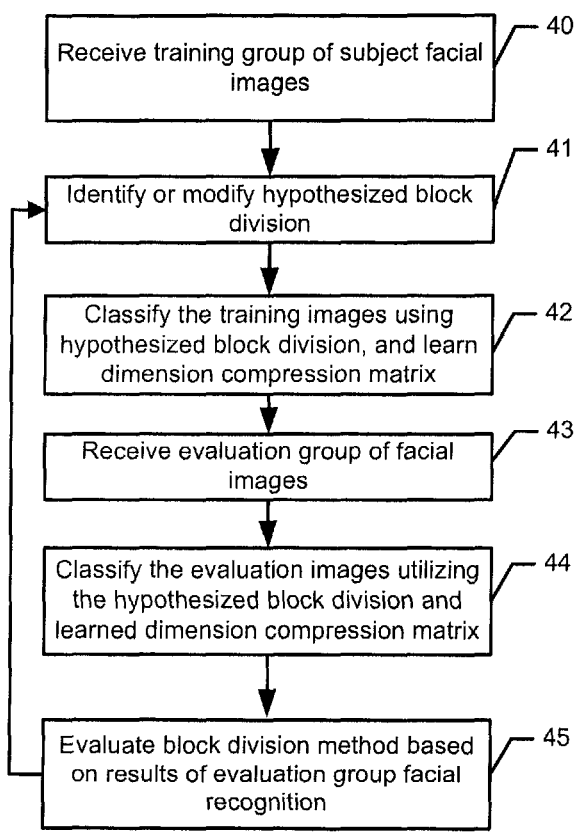
Figure 7:
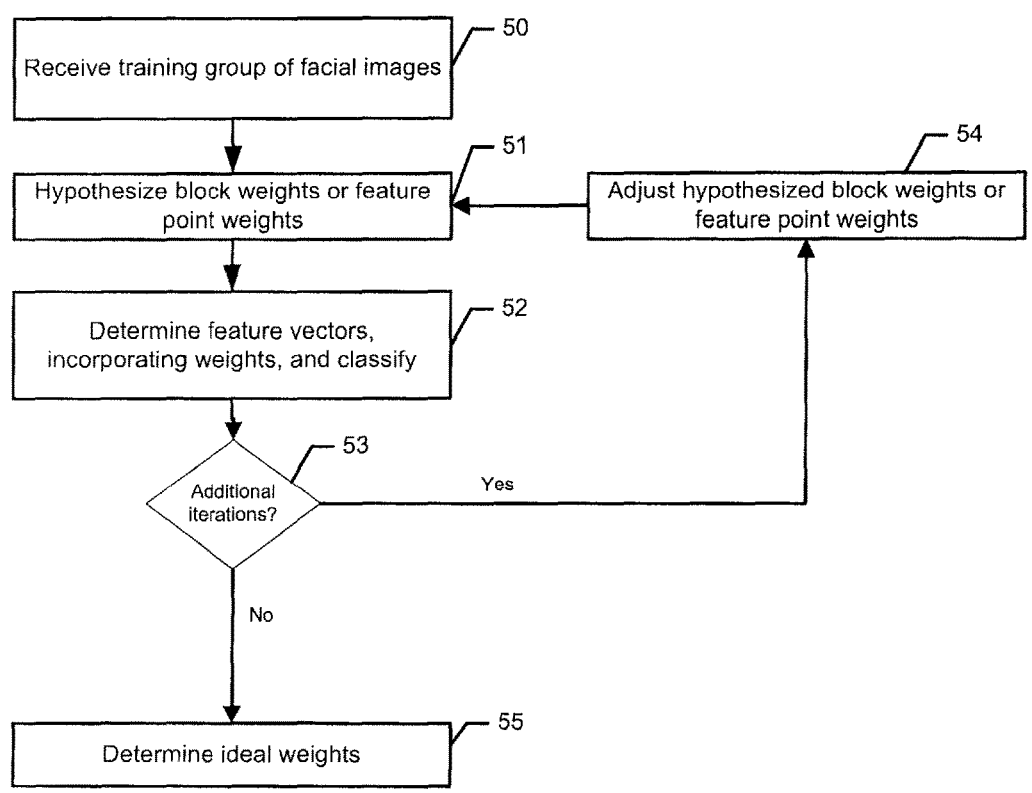
Figure 8A:
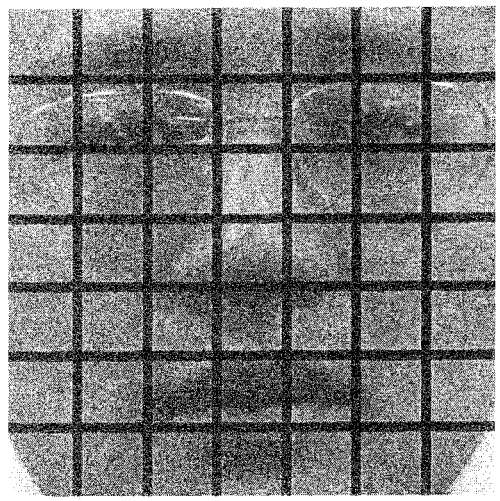
Figure 8B:
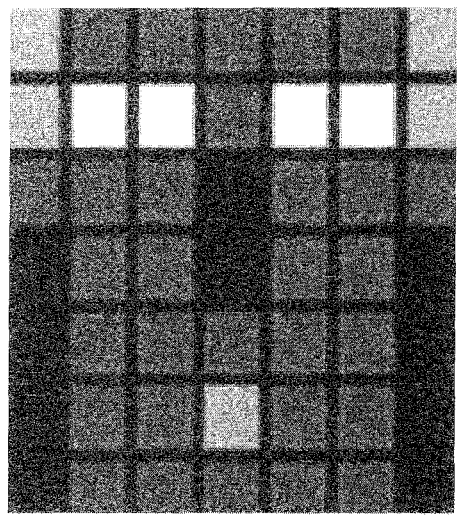

Having thus described certain example embodiments of the present invention in general terms, reference will hereinafter be made to the accompanying drawings which are not necessarily drawn to scale, and wherein:

FIG. 1 is a block diagram of an apparatus that may be configured to implement example embodiments of the present invention;

FIG. 2 is a flowchart illustrating operations to classify an image performed in accordance with one embodiment of the present invention;

FIG. 3a illustrates the identification of a plurality of blocks in accordance with one example embodiment of the present invention;

FIG. 3b illustrates the identification an overlapping block in accordance with one example embodiment of the present invention;

FIG. 4 is a histogram of a block in accordance with one embodiment of the present invention;

FIGS. 5a, 5b, and 5c illustrates the conversion of statistical measurements into a feature vector in accordance with one embodiment of the present invention;

FIG. 6 is a flowchart illustrating operations to evaluate a block division method performed in accordance with one embodiment of the present invention;

FIG. 7 is a flowchart illustrating operations to identify block weights or feature point weights performed in accordance with one embodiment of the present invention; and FIGS. 8a and 8b illustrate the identification of a plurality of weighted blocks in accordance with one embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

As described below, a method, apparatus and computer program product are provided to improve the accuracy and efficiency of a facial recognition system in identifying an enrolled facial image as capturing the same individual as a subject image. In this regard, the method, apparatus and computer program product of an example embodiment may utilize training techniques to optimize block division and weighting before reducing images to a feature vector in order to compare and classify images.

Referring now to FIG. 1, apparatus 25 may include or otherwise be in communication with a processor 20, and a memory device 26. As described below and as indicated by the dashed lines in FIG. 1, in some embodiments the apparatus 25 may also optionally include a camera 28 or other image capturing device, a communication interface 24, and a user interface 22. Apparatus 25 may be embodied by a wide variety of devices including mobile terminals, such as personal digital assistants (PDAs), pagers, mobile televisions, mobile telephones, gaming devices, laptop computers, tablet computers, cameras, camera phones, video recorders, audio/video players, radios, global positioning system (GPS) devices, navigation devices, or any combination of the aforementioned, and other types of voice and text communications systems. The apparatus 25 need not necessarily be embodied by a mobile device and, instead, may be embodied in a fixed device, such as a computer or workstation.

In some embodiments, the processor 20 (and/or co-processors or any other processing circuitry assisting or otherwise associated with the processor 20) may be in communication with the memory device 26 via a bus for passing information among components of the apparatus 25. The memory device 26 may include, for example, one or more volatile and/or non-volatile memories. In other words, for example, the memory device 26 may be an electronic storage device (e.g., a computer readable storage medium) comprising gates configured to store data (e.g., bits) that may be retrievable by a machine (e.g., a computing device like the processor 20). The memory device 26 may be configured to store information, data, content, applications, instructions, or the like for enabling the apparatus to carry out various functions in accordance with an example embodiment of the present invention. For example, the memory device 26 could be configured to buffer input data for processing by the processor 20. Additionally or alternatively, the memory device 26 could be configured to store instructions for execution by the processor 20.

The apparatus 25 may, in some embodiments, be embodied in various devices as described above. However, in some embodiments, the apparatus 25 may be embodied as a chip or chip set. In other words, the apparatus 25 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 25 may therefore, in some cases, be configured to implement an embodiment of the present invention on a single chip or as a single "system on a chip." As such, in some cases, a chip or chipset may constitute means for performing one or more operations for providing the functionalities described herein.

The processor 20 may be embodied in a number of different ways. For example, the processor 20 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 20 may include one or more processing cores configured to perform independently. A multi-core processor may enable multiprocessing within a single physical package. Additionally or alternatively, the processor 20 may include one or more processors configured in tandem via the bus to enable independent execution of instructions, pipelining and/or multithreading.

In an example embodiment, the processor 20 may be configured to execute instructions stored in the memory device 26 or otherwise accessible to the processor 20. Alternatively or additionally, the processor 20 may be configured to execute hard coded functionality. As such, whether configured by hardware or software methods, or by a combination thereof, the processor 20 may represent an entity (e.g., physically embodied in circuitry) capable of performing operations according to an embodiment of the present invention while configured accordingly. Thus, for example, when the processor 20 is embodied as an ASIC, FPGA or the like, the processor 20 may be specifically configured hardware for conducting the operations described herein. Alternatively, as another example, when the processor 20 is embodied as an executor of software instructions, the instructions may specifically configure the processor 20 to perform the algorithms and/or operations described herein when the instructions are executed. However, in some cases, the processor 20 may be a processor of a specific device (e.g., a mobile terminal or network entity) configured to employ an embodiment of the present invention by further configuration of the processor 20 by instructions for performing the algorithms and/or operations described herein. The processor 20 may include, among other things, a clock, an arithmetic logic unit (ALU) and logic gates configured to support operation of the processor 20.

Meanwhile, the communication interface 24 may be any means such as a device or circuitry embodied in either hardware or a combination of hardware and software that is configured to receive and/or transmit data from/to a network and/or any other device or module in communication with the apparatus 25. In this regard, the communication interface 24 may include, for example, an antenna (or multiple antennas) and supporting hardware and/or software for enabling communications with a wireless communication network. Additionally or alternatively, the communication interface 24 may include the circuitry for interacting with the antenna(s) to cause transmission of signals via the antenna(s) or to handle receipt of signals received via the antenna(s). In some environments, the communication interface 24 may alternatively or also support wired communication. As such, for example, the communication interface 24 may include a communication modem and/or other hardware/software for supporting communication via cable, digital subscriber line (DSL), universal serial bus (USB) or other mechanisms.

In some embodiments, such as instances in which the apparatus 25 is embodied by a user device, the apparatus 25 may include a user interface 22 that may, in turn, be in communication with the processor 20 to receive an indication of a user input and/or to cause provision of an audible, visual, mechanical or other output to the user. As such, the user interface 22 may include, for example, a keyboard, a mouse, a joystick, a display, a touch screen(s), touch areas, soft keys, a microphone, a speaker, or other input/output mechanisms. Alternatively or additionally, the processor 20 may comprise user interface circuitry configured to control at least some functions of one or more user interface elements such as, for example, a speaker, ringer, microphone, display, and/or the like. The processor 20 and/or user interface circuitry comprising the processor 20 may be configured to control one or more functions of one or more user interface elements through computer program instructions (e.g., software and/or firmware) stored on a memory accessible to the processor 20 (e.g., memory device 26, and/or the like).

In some embodiments, such as instances in which the apparatus 25 is embodied by a user device, the apparatus 25 may include a camera 28 or other image capturing device, which is configured to capture images, including video images. In other embodiments, however, the apparatus 25 may not include a camera 28, with an image, instead, being provided by memory device 26 or via communication interface 24.

Referring now to FIG. 2, the operations for identifying a facial image are outlined in accordance with on example embodiment. In this regard and as described below, the operations of FIG. 2 may be performed by an apparatus 25. The apparatus 25 may include means, such as the camera 28, the processor 20, the communication interface 24 or the like, for receiving an image of a face, as shown in operation 30. As shown in operation 31, the apparatus may include means, such as the processor 20 or the like, for optionally normalizing the image of the face. The image may be a cropped image of the face, or it could be a larger image with background or full bodies not utilized in the identification process, in which case the image may be cropped to focus on the face. The normalization may also include reducing or eliminating variables including, but not limited to, head tilt, image angle, illumination, and expression.

Continuing to operation 32, apparatus 25, the method, or computer program product of some embodiments may include means, such as the processor 20, or the like, for identifying a block or blocks into which the image may be broken. The block(s) may cover the entire facial image, a portion, or portions of the image. A block may be rectangular, or as in some embodiments, advantageously shaped in any way, as illustrated in FIGS. 3a and 3b, to provide for improved accuracy in identification in comparison to an embodiment calling for rectangular division. The blocks may be identified manually, by user input provided via user interface 22 or communication interface 24, or they may be programmatically formulated and optionally refined, in some embodiments, as described in further detail below.

In order to identify the blocks, the apparatus, method, or computer program product of some embodiments may optionally rely on key points to be first identified on the facial image, as indicated by points $A_i$ in FIG. 3a. The key points $A_i$ may be manually identified or systematically identified using various feature recognition techniques utilizing knowledge regarding location of natural curves and distinguishing points on a face. Following identification of key points $A_i$, block may be identified by measuring the distance from a pixel P, to each key point $A_j$, and assigning pixel P to a block encompassing a closest key point $A_i$. A block division according to this example embodiment is illustrated in FIG. 3a, where P is located closest to key point $A_0$, and thus resides in the same block as $A_0$. This process may be repeated for each pixel P.

Furthermore, apparatus 25 may include means, such as the processor 20 or the like, for utilizing a block division that is either self-contained with no overlap between the blocks or overlapping in order to identify the block(s). FIG. 3a illustrates blocks that are self-contained, while the shaded area of FIG. 3b illustrates an overlapping block. The processor 20 of some embodiments may utilize a mathematical formula to determine a shaded area. For example, a block encompassing $A_0$ may be extended to include a pixel P for which Distance($A_0$, P)<=(minimum(Distance($A_j$, P)))*Alpha, where $A_j$ is a set of key points. Any desired Alpha value may be used. For example, in FIG. 3b, Alpha=1.3.

Returning now to FIG. 2, after blocks have been identified on an image at operation 32, a measurable statistical property of the facial image may be identified. A simple example of a measurable statistical property is grayscale levels, which may be measured on a scale of 0 to 255. Other statistical properties that may be used in accordance with various embodiments may include Local Binary Patterns (LBP), Discrete Cosine Transformation (DCT) parameters, Gabor wavelets, Haar wavelets, or any other form of a statistical property measurement. In some embodiments, either a single measurable property may be used in the facial recognition process, or any combination of measurable properties.

Apparatus 25 may include means, such as the processor 20 or the like, to measure the properties of pixels encompassed within a block, such as in operation 33, and to optionally capture the data in a histogram, as illustrated in FIG. 4, and as described in operation 34. The histogram representing the statistical property distribution of a block shows the number of pixels having a particular value, or bin. With respect to grayscale values, each bin may represent a different grayscale value on a different range of grayscale values, such that the histogram depicts the number of pixels having a respective grayscale value. Next, in operation 35, the histogram may be converted into a vector, or, in the instance of multiple blocks and histograms, the histograms are converted into first a plurality of vectors and then concatenated to arrive at a feature vector of the image. A concatenation of 500 vectors representing 500 blocks using the example gray scale values can be seen in FIGS. 5a and 5b. In this example, block 1 contains 16 pixels with a grayscale level of 0, 19 pixels with a grayscale level of 1, and so on. The concatenation results in a vector as illustrated in FIG. 5b, where the feature vector of the image has 256*500, or 128,000 elements. Since a vector of this size may inhibit efficient processing or analysis of the vector, the apparatus, methods, or computer program products of some embodiments may include means, such as the processor 20, or the like, for applying a dimension compression matrix to the feature vector in order to reduce the vector to a more manageable size. See operation 38. A potential outcome of such a compression is illustrated in FIG. 5c. The dimension compression matrix may be determined by a variety of techniques, including, but not limited to, principal component analysis (PCA), or linear discriminant analysis (LDA).

Following the optional compression, in operation 39, the apparatus 25 may include means, such as the processor 20, or the like for comparing a feature vector against vectors of enrolled images that may have undergone a similar or same block division, vector conversion and compression process. The efficiency of comparison operation 39 may improve significantly with the application of a dimension compression matrix. Various algorithms for comparing the vectors may be implemented, for example, by the processor, and influence on the efficiency of the comparison may vary among algorithms. In some embodiments, the apparatuses, method, or computer program product, such as processor 20, may provide a comparison that identifies a pair or any group of images whose feature vectors resemble one another's, and in these scenarios, the subjects of the images may be presumed to be one in the same, thus resulting in an image identification.

In some embodiments, feature vectors may alternatively or additionally be used to identify characteristics of a facial image. Certain statistical properties may have known ranges which when recognized on a subject facial image, may lead to identification of gender, age, emotion, or any other characteristic. Apparatus may include means, such as the process 20, or the like, for comparing the values in feature vectors against feature vectors of images with a known characteristic, and therefore provide for identification of that same characteristic in a subject image.

Continuing to FIG. 6, in those embodiments whose apparatus, methods, or computer program products implement a block division, the division may be optimized through a training process, as described herein. The goal of the optimization is to divide the blocks in a manner such that the resulting vector leads to a more accurate identification process. In operation 40, the apparatus 25 includes means, such as processor 20, or the like, for receiving a training group of subject facial images. The images may be provided by communication interface 24, memory device 26, or a user interface 22, or captured by camera 28. The training group may include multiple images known to have captured the same individual. In operation 41, the apparatus 25 includes means, such as the processor 20, user interface 22, or the like, for identifying the hypothesized block division. The block division may be determined according to the key point identification technique as described above. The division may be manually provided via user interface 22, or determined by processor 20. Example embodiments in which the processor formulates the block division may include applying adjustments to a previously applied block division, or by employing other hypothesized block divisions.

Operation 42, may include means, such as the processor 20 or the like, for classifying, or identifying characteristics or matches amongst, the images. More specifically, the classification, in accordance with one embodiment, may comprise of operations 30-39 as previously described, and utilize the hypothesized block division in regards to the block division operation. The apparatuses, methods, and computer program products of those embodiments implementing matrix compression, such as the processor 20, or the like, may learn a dimension compression matrix during the classification of the images.

In operation 43, the apparatus 25 includes means, such as processor 20, or the like, for identifying a set of evaluation facial images. The images may be provided by communication interface 24, memory device 26, or a user interface 22, or captured by camera 28. Again, some images may be known to be of the same subject, so as to provide for a test of the accuracy of the block division. In operation 44, the apparatus 25 includes means, such as processor 20, or the like, for classifying the evaluation images, such as according to operations 30-39, during which the hypothesized block division and learned dimension compression matrix is applied. In embodiments utilizing this training procedure, the apparatus, method, or computer program product may provide means, such as processor 20, or the like, for evaluating the block division, at operation 45, by analyzing the results of the image identification. Training and evaluation cycles may be iterated by returning to operation 41, where the block division may be fine-tuned until a desired level of optimization is reached.

In embodiments utilizing the described training procedures, methods, apparatuses, and computer program product may direct the optimization toward a key point distribution, which may ultimately lead to a block division through the techniques described above. In training and evaluating a key point distribution, a best key point distribution can be defined as $D^{\wedge}=\|arg|_\downarrow(\{D\})^\uparrow maxR(S|_\downarrow t|D)$, where $R(S_t|D)$ is a recognition rate identified with training set $S_t$.

Continuing to FIG. 7, the apparatus, method, or computer program product of some embodiments may employ a training process to apply varying weights to blocks. In operation 50, the apparatus 25 includes means, such as processor 20, or the like, for identifying a group of training facial images. The images may be provided by communication interface communication interface 24, memory device 26, or a user interface 22, or captured by camera 28. Like previously described training groups, some images may be of the same subject. The training images may undergo a similar vector conversion and classification process as previously described, but in this example embodiment, at operation 51, the apparatus 25 may include means, such as processor 20, or the like, for applying block division and weighting the various block using, for example, a weight for each block that is hypothesized. The weights may be incorporated into the feature vectors as they are created. For example, a block with a relatively low weight may have a reduced number of elements, or range of measurement, in its vector while a block with a higher weight will have a greater number of elements. Alternatively, a heavily weighted block may include all its encompassing pixels in its feature vector, while a block having a lower weight may include a smaller percentage or no pixels in its feature vector. Or, the apparatus, method, or computer program product of some embodiments may employ other techniques for reducing or compressing vectors associated with blocks of relatively low weight. The apparatus 25 may include means, such as processor 20, or the like, for classifying the images based on the weighted feature vectors. Iterations are initiated at operation 53, and at operation 54, processor 20, or the like, may adjust weights, and operations 51 and 52 are repeated to reclassify the images. At operation 55 of FIG. 7, the apparatus, method, or computer program product may provide means for analyzing the results of the training and identifying ideal weights of the blocks.

In embodiments utilizing normalization operation 31, apparatuses, methods and computer program products may utilize weighting of individual pixels, also using the training process illustrated in FIG. 7. These embodiments may employ 3-dimensional morphable model (3DMM) processes, in which a 2-dimensional image is reconstructed as a 3D image in order to improve a facial recognition process. Many traditional 3DMM treat all pixels or facial points equally. Applying varying weights to the points in an image prior to the 3DMM process may include a process 20 configured to improve accuracy in the normalization phase. Apparatuses, methods, and computer program products of some embodiments may implement a 3D fitting algorithm, such as, where $\alpha$ represents a shape parameter, $\rho$ represents rendering parameters such as pose and illumination, $(x_{f_j}, y_{f_j})$ are coordinates of facial point $f_j$, and $w_{f_j}$ represents a calculated weight of $f_j$. Weight w may be calculated by applying operations 50-55.

In the training process illustrated in FIG. 7, apparatuses, methods, and computer program products of some example embodiments may include a processor 20 configured to employ boosting algorithms, such as Adaboosting, in order to optimize weights of the blocks. In this regard, weak learners are identified and updated throughout iterations. Classification error rates may be calculated throughout the iterations, and their progress measured in comparison to the shifting weights. Various weak learners and their respective blocks are appropriately weighted by analyzing a block's impact on a classification error rate, the error rate taking into account false classifications and additionally missed identification opportunities. Blocks shown to significantly decrease the classification error rate may have a greater weight than those that have little effect on the error rate.

An example of a weight application is illustrated in FIGS. 8a and 8b. FIG. 8a is a facial image, and 8b is an image illustrating weighted blocks, in accordance with one embodiment, in which blocks of a greater weight are lighter in color, and blocks with a lower weight are darker in color. Applying varying weights to the blocks, and incorporating them into the feature vectors may improve the accuracy of the facial recognition, as many features, such as eyes, offer more distinguishing capabilities than other areas, such as, for example, cheeks.

As described above, FIGS. 2, 6, and 7 illustrate a flowchart of an apparatus 25, method, and computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 26 of an apparatus 25 employing an embodiment of the present invention and executed by a processor 20 of the apparatus 25. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

The method, apparatus 25 and computer program product may be utilized in various scenarios. In one embodiment, images could be provided via user interface 22 or a communication interface 24. Alternatively, images could be captured real-time by camera 28.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   accessing a trained block division trained on a set of facial images of a same subject, wherein the trained block division is trained by iterative evaluation and modification;
   receiving a subject facial image;
   normalizing the subject facial image and applying the trained block division to the subject facial image by performing:
   (a) identifying a plurality of key point pixels in the subject facial image, wherein the plurality of key points are dynamically identified using data comprising distinguishing points on faces according to the trained block division; and
   (b) measuring the distance from each of a plurality of pixels P, to each respective key point pixel and assigning each respective pixel P to a block encompassing a closest key point pixel;
   determining statistical property measurements for respective pixels in at least one block of the subject facial image;
   converting the statistical property measurements into a feature vector; and
   identifying, by a processor, at least one characteristic of the subject facial image by comparing the feature vector to a plurality of feature vectors of enrolled images;
   wherein training the block division comprises:
      receiving a training group of facial images comprising at least a plurality of facial images of the same subject;
      applying block division to the training group;
      classifying images in the training group following the application of block division;
      utilizing results of the classification to determine a learned dimension compression matrix;
      receiving an evaluation group of facial images comprising at least a plurality of facial images of the same subject;
      applying the block division to the evaluation group;
      applying the learned dimension compression matrix to the evaluation group following application of the block division; and
      evaluating the block division based on results of applying the learned dimension compression to the evaluation group.

2. A method of claim 1 wherein:
   the converting further comprises creating at least one histogram of bins, wherein a bin is associated with a unique statistical property measurement value and a bin frequency represents a number of pixels in the at least one block measuring at the unique statistical property measurement value.

3. A method of claim 1 further comprising:
   identifying a plurality of blocks of a facial image in which at least one block overlaps another block.

4. A method of claim 1 wherein the method further comprises:
   receiving at least one training facial image;
   performing a block division on the training facial image;
   assigning hypothesized block weights to each block of the training facial image;
   incorporating the respective block weights into a feature vector for the training facial image;
   classifying the training facial image based on the feature vector that incorporates the respective block weights;
   determining a classification error rate for the classification based on the feature vector that incorporates the respective block weights;
   adjusting at least one of the block weights and re-classifying the training facial image according to the adjustment;
   analyzing changes in a classification error rate throughout classification iterations with variable block weights;

determining a block ideal weight for the at least one of the block weights based on the analyzed changes in the classification error rate; and applying the at least one ideal block weight to the respective block while utilizing the feature vector.

5. A method of claim 1 further comprising:
assigning a weight to a facial feature point of the facial image; and
utilizing the weight in normalizing the facial image.

6. An apparatus comprising at least one processor and at least one memory including computer program code, the at least one memory and the computer program code configured to, with the processor, cause the apparatus to at least:
access a trained block division trained on a set of facial images of a same subject, wherein the trained block division is trained by iterative evaluation and modification;
receive a subject facial image;
normalize the subject facial image and applying the trained block division to the subject facial image by performing:
  (a) identifying a plurality of key point pixels in the subject facial image, wherein the plurality of key points are dynamically identified using data comprising distinguishing points on faces according to the trained block division; and
  (b) measuring the distance from each of a plurality of pixels P, to each respective key point pixel and assigning each respective pixel P to a block encompassing a closest key point pixel;
determine statistical property measurements for respective pixels in at least one block of the subject facial image;
convert the statistical property measurements into a feature vector; and
identify, by a processor, at least one characteristic of the subject facial image by comparing the feature vector to a plurality of feature vectors of enrolled images;
wherein the at least one memory and the computer program code are further configured to, with the processor, cause the apparatus to train the block division by causing the apparatus to:
receive a training group of facial images comprising at least a plurality of facial images of the same subject;
apply block division to the training group;
classify images in the training group following the application of block division;
utilize results of the classification to determine a learned dimension compression matrix;
receive an evaluation group of facial images comprising at least a plurality of facial images of the same subject;
apply the block division to the evaluation group;
apply the learned dimension compression matrix to the evaluation group following application of the block division; and
evaluate the block division based on results of applying the learned dimension compression to the evaluation group.

7. An apparatus of claim 6 wherein the at least one characteristic comprises at least one of age, gender, or expression.

8. An apparatus of claim 6 wherein the characteristic is the identity of the subject facial image, and the identifying comprises identifying an enrolled facial image that resembles the subject facial image by comparing the feature vector to a plurality of enrolled feature vectors.

9. An apparatus of claim 6 wherein the at least one memory and the computer program code are further configured to, with the processor, cause the apparatus to:
compress the feature vector by applying a dimension compression matrix; and
compress the enrolled feature vectors by applying the dimension compression matrix.

10. An apparatus of claim 6 wherein the at least one memory and the computer program code are further configured to, with the processor, cause the apparatus to create at least one histogram of bins, wherein a bin is associated with a unique statistical property value and a bin frequency represents a number of pixels in the at least one block measuring at the unique statistical property value.

11. An apparatus of claim 10 wherein the at least one memory and the computer program code are further configured to, with the processor, cause the apparatus to convert a plurality of histograms, each representing a block of the subject facial image, into a plurality of vectors and subsequently converting the plurality of vectors into the feature vector.

12. An apparatus of claim 6 wherein the at least one memory and the computer program code are further configured to, with the processor, cause the apparatus to:
identify a plurality of blocks of a facial image in which at least one block overlaps another block.

13. An apparatus of claim 6 wherein the at least one memory and the computer program code are further configured to, with the processor, cause the apparatus to:
receive at least one training facial image;
perform a block division on the training facial image;
assign hypothesized block weights to each block of the training facial image;
incorporate the respective block weights into a feature vector for the training facial image;
classify the training facial image based on the feature vector that incorporates the respective block weights;
determine a classification error rate for the classification based on the feature vector that incorporates the respective block weights;
adjust at least one of the block weights and re-classifying the training facial image according to the adjustment;
analyze changes in a classification error rate throughout classification iterations with variable block weights; and
determine an ideal weight by analyzing a block's impact on the classification error rate.

14. An apparatus of claim 6 wherein the at least one memory and the computer program code are further configured to, with the processor, cause the apparatus to:
assign a weight to a facial feature point of the facial image; and
utilize the weight in normalizing the facial image.

15. A computer program product comprising at least one non-transitory computer-readable storage medium having computer-executable program code instructions stored therein, the computer-executable program code instructions comprising program code instructions to:
access a trained block division trained on a set of facial images of a same subject, wherein the trained block division is trained by iterative evaluation and modification;
receive a subject facial image;
normalize the subject facial image and applying the trained block division to the subject facial image by performing:

(a) identifying a plurality of key point pixels in the subject facial image, wherein the plurality of key points are dynamically identified using data comprising distinguishing points on faces according to the trained block division; and
(b) measuring the distance from each of a plurality of pixels P, to each respective key point pixel and assigning each respective pixel P to a block encompassing a closest key point pixel;

determine statistical property measurements for respective pixels in at least one block of the subject facial image;

convert the statistical property measurements into a feature vector; and identify, by a processor, at least one characteristic of the subject facial image by comparing the feature vector to a plurality of feature vectors of enrolled images;

wherein the computer program code instructions are further configured to train the block division by including program code instructions to:

receive a training group of facial images comprising at least a plurality of facial images of the same subject;

apply block division to the training group;

classify images in the training group following the application of block division;

utilize results of the classification to determine a learned dimension compression matrix;

receive an evaluation group of facial images comprising at least a plurality of facial images of the same subject;

apply the block division to the evaluation group;

apply the learned dimension compression matrix to the evaluation group following application of the block division; and evaluate the block division based on results of applying the learned dimension compression to the evaluation group.

* * * * *